(12) United States Patent
Degler

(10) Patent No.: US 7,882,881 B2
(45) Date of Patent: Feb. 8, 2011

(54) TOOL FOR INSERTING TAPE INTO HARD-TO-REACH AREA

(76) Inventor: David P. Degler, 271 Locust La., Cinnaminson, NJ (US) 08077

( * ) Notice: Subject to any disclaimer, the term of this patent is extended or adjusted under 35 U.S.C. 154(b) by 903 days.

(21) Appl. No.: 11/624,000

(22) Filed: Jan. 17, 2007

(65) Prior Publication Data

US 2007/0175590 A1   Aug. 2, 2007

Related U.S. Application Data

(60) Provisional application No. 60/759,504, filed on Jan. 17, 2006.

(51) Int. Cl.
*B44C 7/00* (2006.01)
(52) U.S. Cl. .................. 156/577; 156/579; 425/458; 15/236.04
(58) Field of Classification Search .............. 156/577, 156/579; 15/236.04; 425/458
See application file for complete search history.

(56) References Cited

U.S. PATENT DOCUMENTS 5,342,466 A * 8/1994 Eidson ...................... 156/179
6,611,983 B1 * 9/2003 Hopey ..................... 15/104.03

* cited by examiner

*Primary Examiner*—Khanh Nguyen
*Assistant Examiner*—Vishal I Patel
(74) *Attorney, Agent, or Firm*—Saul Ewing LLP

(57) ABSTRACT

A tool is disclosed comprising a thin, ribbon-like but semi-rigid material which can be "snaked" in between ductwork and the surface to which it is attached. The tool is configured to enable the temporary attachment of a tape material thereon. Further, the tape material includes a non-adhesive "release tape" attached to the adhesive portion of the adhesive tape. Using the method and apparatus described herein, a user can insert the tape, with the protective tape release thereon, around the ductwork, release the tape and remove the tool, and use the tool as it is being withdrawn to urge the adhesive tape onto the seam being taped.

8 Claims, 4 Drawing Sheets

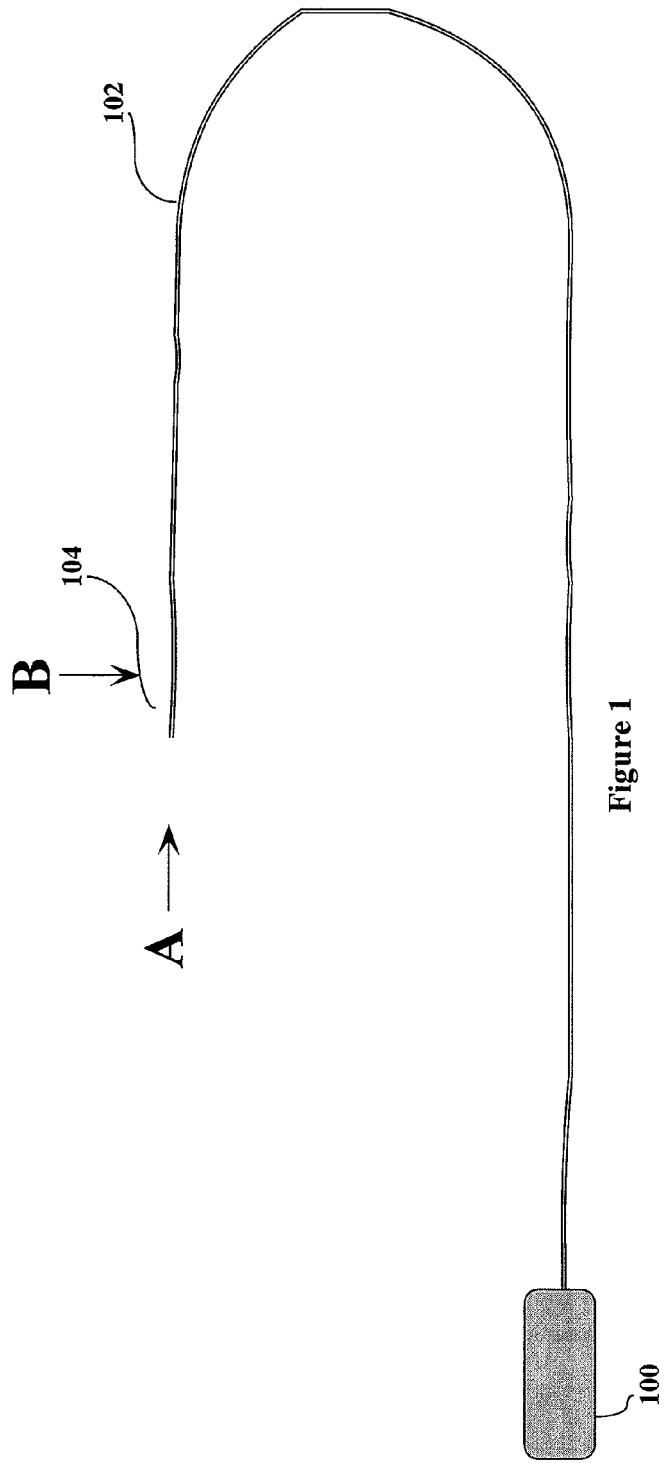
Figure 1
Figure 1A
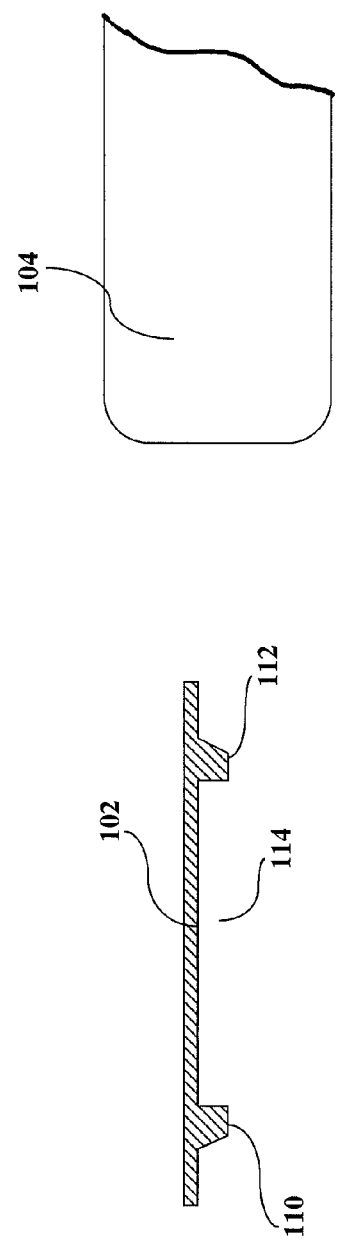
Figure 1B

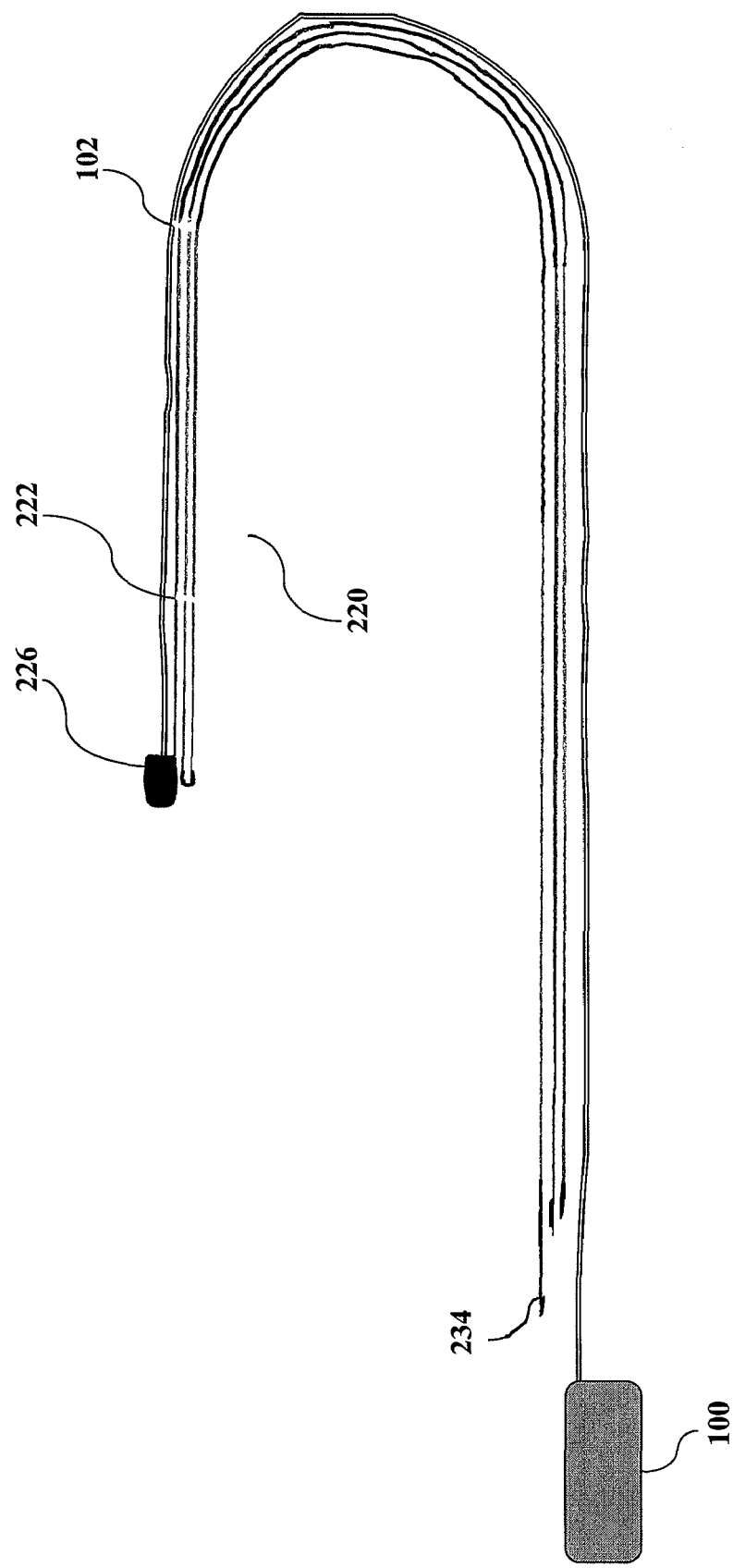

TOOL FOR INSERTING TAPE INTO HARD-TO-REACH AREA

CROSS-REFERENCE TO RELATED APPLICATIONS

This application is based on and claims priority to provisional Application No. 60/759,504, filed Jan. 17, 2006, the contents of which are incorporated fully herein by reference.

BACKGROUND OF THE INVENTION

This invention relates to the field of the application of tape or other sealing strips in difficult-to-reach locations, and, more particularly, to a device for facilitating same.

In the construction of buildings, both residential and commercial, there is typically a significant amount of effort expended to install functionally important but aesthetically undesirable elements inside walls, below floors, and above ceilings. Examples of such elements include electrical wiring, piping and plumbing, and ductwork for heating and air conditioning.

Ductwork in particular presents significant challenges to the builder and installer due to its size and shape. Typical ductwork is shaped in the form of rectangular or oval conduit and is usually a foot or more in width and 6-9 inches in height. Installation of this ductwork is typically done in such a manner that it is placed as close as possible to the structural portion of the house to which it is attached, for example, the underside of a floor of a room to which the conduit/ductwork is providing heating or cooling.

Ductwork typically has to be routed in a somewhat roundabout manner to navigate through the various structural elements in the house so as to get the heated or cooled air from the heating/air conditioning unit to the rooms in the house. As a result, most ductwork is a series of sections of smaller pieces, interconnected to each other using rivets, screws, or other fastening methods.

For numerous reasons, including but not limited to operational efficiency, aesthetics, protection from sharp edges, and building codes, it is quite common, and often required, that the seams between two sections of ductwork be taped to seal them off. This very important taping function can be very difficult, particularly when installing the tape after the ductwork has been installed in the building structure, as is typically the case when a preexisting house is subjected to new building codes that require taping.

A particular problem is created by the close proximity of the ductwork to the structure to which it is mounted, i.e., underneath the floor of a room. Since the ductwork is mounted close to the floor to which it is attached, there is typically very little space between the floor and the ductwork to slide the tape around the seam. The process is further complicated because ductwork is a dust and dirt collector, and thus, when sliding a piece of tape having adhesive thereon along the top of the ductwork, between the ductwork and the floor, the adhesive tends to pick up dust and dirt, thereby reducing or nullifying the adhesive effect of the adhesive material.

Accordingly, there is a need for a method and apparatus for enabling the insertion of tape or other sealing strip material around ductwork in between the ductwork and the flooring above, and in such a manner to minimize or completely prohibit the contacting of the adhesive material of the tape with dirt and other particular matter on the ductwork.

SUMMARY OF THE INVENTION

The present invention is a tool comprising a thin, ribbon-like but semi-rigid material which can be "snaked" in between ductwork and the surface to which it is attached. The tool is configured to enable the temporary attachment of a tape material thereon. Further, the tape material includes a non-adhesive "release tape" attached to the adhesive portion of the adhesive tape. Using the method and apparatus described herein, a user can insert the tape, with the protective tape release thereon, around the ductwork, release the tape and remove the tool, and use the tool as it is being withdrawn to urge the adhesive tape onto the seam being taped.

BRIEF DESCRIPTION OF THE DRAWINGS

FIG. 1 is a side-view of a tool in accordance with the present invention, and FIG. 1A is a cross-sectional view of end 104 of the tool of FIG. 1, looking from the direction labeled "A" in FIG. 1; FIG. 1B is a top view of end 104 looking from the direction labeled "B" in FIG. 1.

FIG. 3 illustrates a section of tape element 200 installed on the tool of FIG. 1 in such a manner as to enable it to be used to apply the tape to a structure such as ductwork.

DETAILED DESCRIPTION OF THE PREFERRED EMBODIMENTS

FIG. 1 is a side-view of a tool in accordance with the present invention, and FIG. 1A is a cross-sectional view of end 104 of the tool of FIG. 1, looking from the direction labeled "A" in FIG. 1. FIG. 1B is a top view of end 104 looking from the direction labeled "B" in FIG. 1. Referring to FIG. 1, a handle 100 is connected to a blade portion 102. The blade portion comprises, in a preferred embodiment, molded or spring steel that is essentially flat but that forms an uneven U-shaped member as shown in FIG. 1, having an end 104. Semi-rigid plastic may also be utilized instead of metal; in fact, any material exhibiting the rigid-but-flexible characteristics described herein may be utilized. The longer end of the U-shaped member is attached to handle 100 using any known fastening method, including screws or other fasteners, and/or by molding the end of the U-shaped member into a material used to form the handle 100, such as rubber, plastic or the like. In the preferred embodiment, the member 102 is semi-rigid so that it can be deformed from the U-shape shown in FIG. 1 but will return to essentially the same shape when the energy or energy source causing the deformation is removed. It is understood that the entire device can also be of unitary construction if desired, e.g., using molded plastic.

Figure 4:
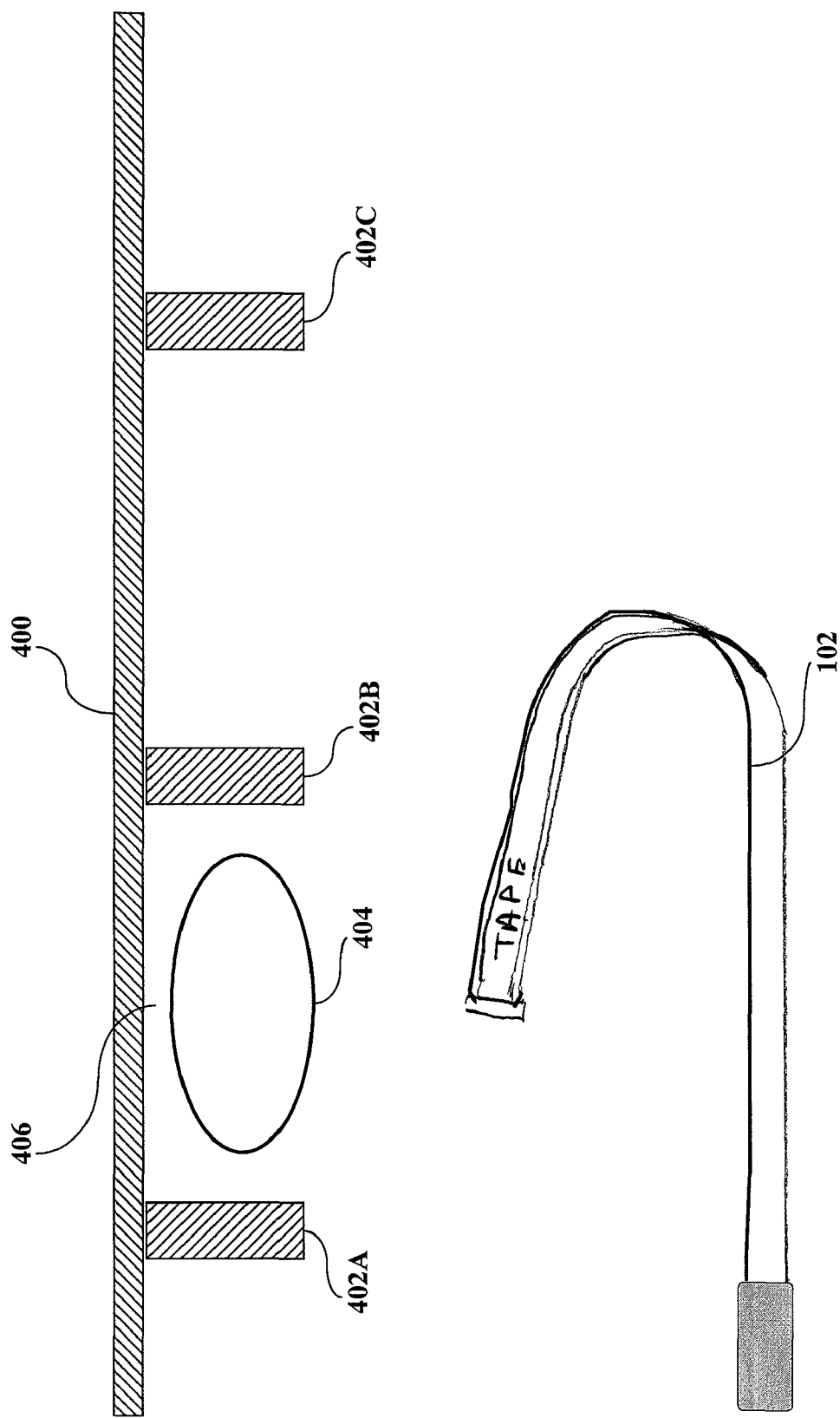
FIG. 4 is a cut-away side-view of a floor under which are installed a series of joists in a well known manner.

For reasons described below with respect to FIGS. 2-4, in a preferred embodiment, the inside portion of the U-shaped member includes ridges 110 and 112 formed thereon, thereby creating a recessed area 114.

Figure 2A:
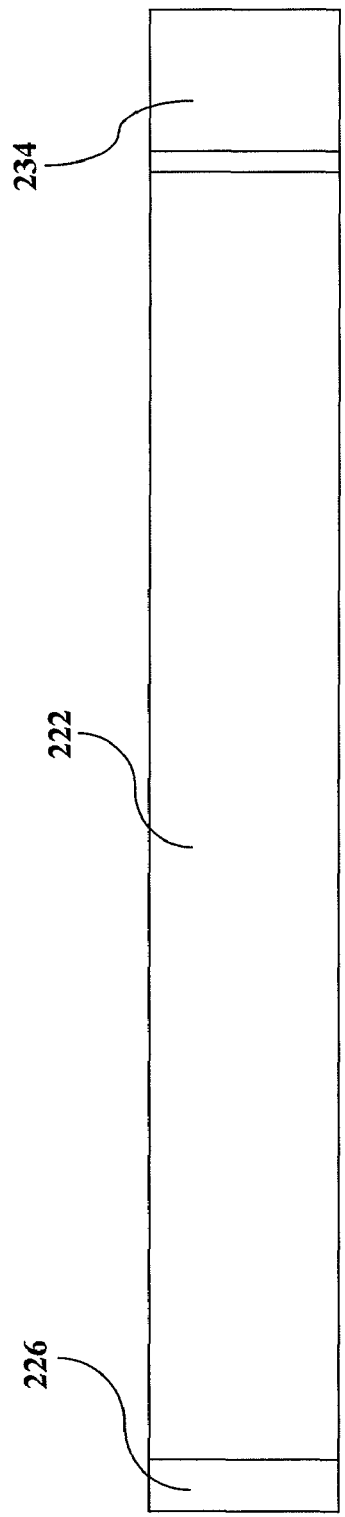
FIGS. 2A and 2B illustrate a tape insert utilized with the tool illustrated in FIG. 1 to apply tape to an area of ductwork.
Figure 2B:
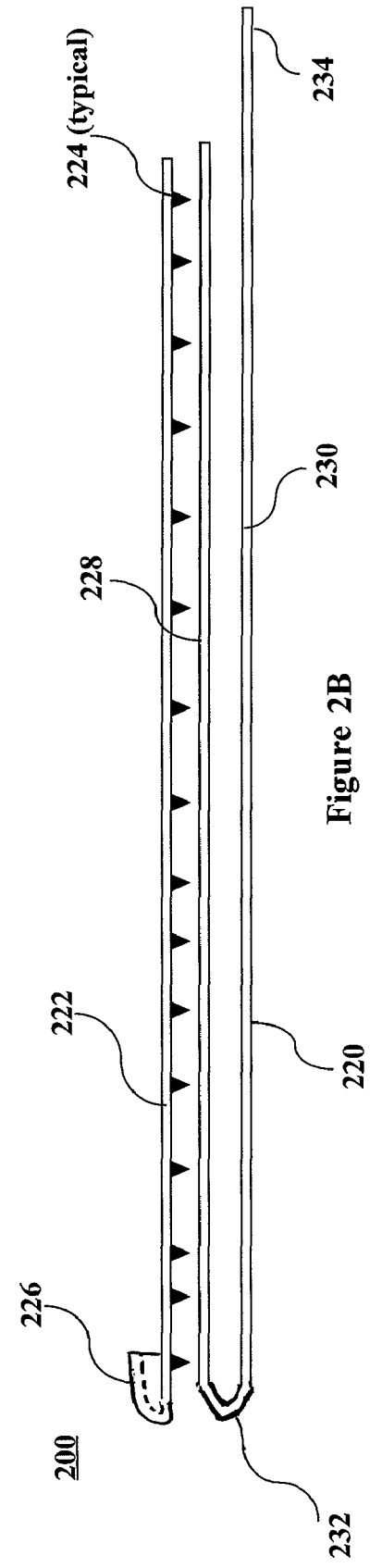

FIGS. 2A and 2B illustrate a side view and top view, respectively, of a tape element 200 utilized with the tool illustrated in FIG. 1 to apply tape to an area of ductwork, as described more fully below. The tape element 200 comprises two parts, a release-tape portion 220 and a tape portion 222. Tape portion 222 is a length of tape having, in a well known manner, adhesive material 224 formed or affixed on one side thereof to allow the tape to be pressure-fastened to material, such as ductwork. A pocket 226 is formed at one end of tape element 222, on the top thereof. A sheet of release tape 220 is releasably attached to the adhesive side of tape 222 using well known techniques. The release tape 220, however, has a first portion 228 that contacts the adhesive 224 and a second portion 230 which is formed by folding back the release tape 220 at folding point 232 as shown. In a preferred embodiment, the first portion 228 is slightly shorter than the second portion 230 to create a tab 234 which can be easily grasped to release the tape when desired. The width of the release tape 220 and the width of the adhesive tape 222 can be essentially the same; if one is to be of larger width than the other, then it is desirable to have the release tape 220 be slightly wider than the adhesive tape 222.

FIG. 3 illustrates a tape element 200 installed on the tool 102 of FIG. 1 in such a manner as to enable it to be used to apply the tape element 200 to a structure such as ductwork. It is understood that certain of the dimensions shown in the drawings are exaggerated so that the differences between the adhesive tape 222 and the release tape 220 are apparent. For example, in FIG. 2B, there appears to be a gap between tape portion 222 and release tape 220. However, it is understood that in practice the distance between the release tape and the adhesive tape will be essentially zero, that is, they are abutted against each other.

As shown in FIG. 3, the tape element 200 is placed onto the tool 102 by inserting the end 104 of tool 102 into the pocket 226 of the tape portion 222. The width of the tape portion 222 and the pocket 226 attached thereto is formulated such that the end of tool 102 can easily be inserted into the pocket 226. In a preferred embodiment, the end of tool 102 is curved as shown in FIG. 1B to facilitate easy insertion of the tool into the pocket 226.

In a preferred embodiment, the width of the tape element 200 is such that it will fit snugly into recessed area 114 of tool 102, but in a way that it can easily be released. For example, if the width of the tape element 200 is identical to the width of the cavity 114 between the ridges 110 and 112, or if the tape is slightly wider than the distance between the ridges, it will stay in place when inserted in the ridges, but can be easily pulled out with minimal amount of tension applied to it.

The operation of the device of the present invention is illustrated with reference to FIGS. 3 and 4. FIG. 4 is a cut-away side-view of a floor 400 under which are installed a series of joists 402A-402C in a well known manner. The cavity formed between the joists is typically used to run lengths of ductwork 404 as shown. Although not shown, typically the ductwork 404 is attached to the floor 400 and/or the joists 402 using thin metal straps attached to either the joists or the floor, or both. This is a well known configuration and the details are not further discussed herein.

To use the device 102, the user inserts a tape element 200 into the device 102 as shown in FIG. 3. The user then manipulates the tool so that the end 104 goes between joist 402B and the ductwork and slides over the top of the ductwork 404 through slot 406, which is simply the space between the ductwork 404 and the floor 400. The user then pulls the tool 102 so that the end 104 of the tool 102 is pulled through slot 406 and comes out the other side of the ductwork 404 near joist 402A. Once in this position, the user can remove the release tape 220 by pulling on tab 234 at the end of the release tape element 200. This exposes the adhesive of the tape and the user can pull down on the tool 102, thereby applying the adhesive tape to the ductwork 404. If desired or possible, the user can reach up between joist 402A and the ductwork 404 to grab the end of the tool to help in application of the tape.

Once the tape has been affixed to the ductwork 404, the user simply pushes on the tool 102, removing the end 104 of the tool 102 from the pocket 226, leaving the tape in place on the ductwork. The user then removes the tool from the slot 406 in the same manner in which it was inserted in the slot. The user can then affix the remainder of the tape to the ductwork on the underside of the ductwork using his or her hands, since this part of the ductwork is accessible to the installer.

Using the invention disclosed herein, a piece of formed or spring steel is used to fish a specially-manufactured tape element into a difficult-to-attach area. While the example described above make reference to the use of the present invention in connection with taping ductwork, it is useful for maneuvering non-adhesive elements into any hard-to-reach areas. Further, the present invention can be used to maneuver tape or similar materials in and around elements other than ductwork, including plumbing, wiring, and other similar elements installed in hard-to-reach areas. The present invention is intended to cover these uses and applications as well as those described in the example.

The present invention also comprises a method of affixing tape to ductwork, comprising: configuring a tool to have a blade member comprising a semi-rigid element formed into an uneven U-shape, said blade member being generally ribbon-shaped, said blade member temporarily receiving thereon a generally ribbon-shaped tape material including a tape portion and a release-tape portion; and inserting said blade member a first surface and said ductwork such that said tape portion can be affixed to said second surface upon release of said release-tape portion.

While there has been described herein the principles of the invention, it is to be understood by those skilled in the art that this description is made only by way of example and not as a limitation to the scope of the invention. Accordingly, it is intended by the disclosure herein to cover all modifications of the invention which fall within the true spirit and scope of the invention.

What is claimed is:

1. A tool, comprising:
   a blade member comprising a semi-rigid element formed into an uneven U-shape, said blade member being generally ribbon-shaped; and
   a generally ribbon-shaped tape material including a tape portion and a release-tape portion, said tape material being configured to be temporarily connected to said blade member;
   whereby said blade member can be inserted between a first surface and a second surface such that said tape portion is affixable to said second surface upon release of said release-tape portion and whereby said tape material is disconnectable from said blade member after said tape portion is affixed to said second surface.

2. The tool of claim 1, wherein said U-shape defines a first end and a second end of said blade member, further comprising:
   a handle attached to said first end of said blade member.

3. The tool of claim 1, wherein said second surface comprises ductwork and said tape portion is affixable to a seam of said ductwork.

4. A tool, comprising: a blade member comprising a semi-rigid element formed into an uneven U-shape defining a first end and a second end of said blade member, said blade member being generally ribbon-shaped; and a generally ribbon-shaped tape material including a tape portion and a release-tape portion, said generally ribbon-shaped tape material including means for temporarily attaching said tape portion to said second end of said blade member; whereby said blade member can be inserted between a first surface and a second surface such that said tape portion is affixable to said second surface upon release of said release-tape portion.

5. The tool of claim 4, wherein said means for temporarily attaching said tape portion to said second end comprises a pocket formed at one end of said tape portion, said pocket being able to slip over said second end.

6. The tool of claim 5, wherein said blade member further comprises:
 a recessed area formed by the inclusion of first and second ridges on a face of said blade member, so that said generally ribbon-shaped tape material is insertable between said first and second ridges in said recessed area.

7. The tool of claim 6, further comprising:
 a handle attached to said first end of said blade member.

8. The tool of claim 4, wherein said second surface comprises ductwork and said tape portion is affixable to a seam of said ductwork.

* * * * *